(12) United States Patent  
Skowronski

(10) Patent No.: US 6,702,077 B2
(45) Date of Patent: Mar. 9, 2004

(54) NESTED CABLES AND REEL ASSEMBLY

(75) Inventor: Richard E. Skowronski, North Hampton, NH (US)

(73) Assignee: Restech, Inc., North Hampton, NH (US)

( * ) Notice: Subject to any disclaimer, the term of this patent is extended or adjusted under 35 U.S.C. 154(b) by 0 days.

(21) Appl. No.: 10/181,665

(22) PCT Filed: Feb. 1, 2001

(86) PCT No.: PCT/US01/03368

§ 371 (c)(1),
(2), (4) Date: Jul. 19, 2002

(87) PCT Pub. No.: WO01/57887

PCT Pub. Date: Aug. 9, 2001

(65) Prior Publication Data

US 2003/0000788 A1 Jan. 2, 2003

Related U.S. Application Data

(60) Provisional application No. 60/180,005, filed on Feb. 3, 2000.

(51) Int. Cl.[7] .............................................. H02G 11/00
(52) U.S. Cl. ................................................. 191/12.2 R
(58) Field of Search .................. 191/12.4, 12, 12.2 R; 174/113 R, 68.1, 69, 70 R, 71 R, 72 R, 72 A, 72 C, 88 R, 88 C, 88 S, 89, 91, 92, 84 S, 103, 114 R, 115, 148, 149 R

(56) References Cited

U.S. PATENT DOCUMENTS

| 1,247,672 A | 11/1917 | Hallberg |
| 1,276,825 A | 8/1918 | Swope |
| 1,446,410 A | 2/1923 | Bennett et al. |
| 1,663,083 A | 3/1928 | Kavle |
| 1,737,978 A | 12/1929 | Sebell |
| 1,865,069 A | 6/1932 | Allen |

(List continued on next page.)

FOREIGN PATENT DOCUMENTS

| DE | 171356 | 11/1951 |
| DE | 3518157 | 5/1985 |
| GB | 2 316 672 B | 7/1998 |
| WO | WO 98/09415 | 3/1998 |

*Primary Examiner*—Mark T. Le
(74) *Attorney, Agent, or Firm*—Greer, Burns & Crain, Ltd.

(57) ABSTRACT

The cord reel assembly (10) comprises a housing (12); a spool (14) mounted for rotation in the housing (12); an electrical component (15) carried by the spool (14); a first cable (16) having a first end connected to the electrical component (15), the first cable (16) being windable onto and off the spool (14), the first cable (16) having at least one longitudinal cavity (32); and cavity (32); and a second cable (22) having a first end connected to the electrical component (15), the second cable (22) being windable onto and and off the spool (14), the second cable (22) being releasably nested in the cavity (32) of the first cable (16) when when the two cables are co-wound together on the spool (14).

23 Claims, 5 Drawing Sheets

U.S. PATENT DOCUMENTS

| | | | |
|---|---|---|---|
| 2,031,434 A | 2/1936 | Stern et al. | |
| 2,206,352 A | 7/1940 | Hellmann | |
| 2,211,561 A | 8/1940 | Flannelly | |
| 2,262,587 A | 11/1941 | Kaempf | |
| 2,678,779 A | 5/1954 | Bellmer | |
| 2,787,653 A | * 4/1957 | Ormerod | 174/117 R |
| 2,821,579 A | 1/1958 | Benjamin | |
| 2,979,576 A | 4/1961 | Huber | |
| 3,061,234 A | 10/1962 | Morey | |
| 3,490,715 A | 1/1970 | Nicpon | |
| 3,584,157 A | 6/1971 | Prescott | |
| 3,617,659 A | 11/1971 | Freeman | |
| 3,657,491 A | 4/1972 | Ryder et al. | |
| 3,715,458 A | * 2/1973 | Bayes et al. | 174/113 R |
| 3,773,987 A | 11/1973 | Davis et al. | |
| 3,782,654 A | 1/1974 | Kasa | |
| 3,812,307 A | 5/1974 | Wagner et al. | |
| 3,853,285 A | * 12/1974 | Woodring | 242/378.1 |
| 3,858,011 A | 12/1974 | Salvin et al. | |
| 4,008,791 A | 2/1977 | Shafii-Kahany et al. | |
| 4,053,118 A | 10/1977 | Aikins | |
| 4,062,608 A | 12/1977 | Pierce | |
| 4,081,153 A | 3/1978 | Tanaka et al. | |
| 4,141,438 A | 2/1979 | Diem | |
| 4,384,688 A | 5/1983 | Smith | |
| 4,386,744 A | 6/1983 | Higbee | |
| 4,472,010 A | 9/1984 | Parnello | |
| 4,520,239 A | * 5/1985 | Schwartz | 191/12.4 |
| 4,646,987 A | 3/1987 | Peterson | |
| 4,736,826 A | 4/1988 | White et al. | |
| 4,813,627 A | 3/1989 | Nelson | |
| 4,940,859 A | 7/1990 | Peterson | |
| 5,094,396 A | 3/1992 | Burke | |
| 5,104,056 A | 4/1992 | Jannotta et al. | |
| 5,114,091 A | 5/1992 | Peterson et al. | |
| 5,124,685 A | 6/1992 | Rankin | |
| 5,155,766 A | 10/1992 | Skowronski | |
| 5,156,242 A | 10/1992 | Ditzig | |
| 5,289,987 A | 3/1994 | Collins et al. | |
| 5,332,171 A | 7/1994 | Steff | |
| 5,520,350 A | 5/1996 | Doty et al. | |
| 5,526,997 A | 6/1996 | Karczmer | |
| 5,535,960 A | 7/1996 | Skowronski et al. | |
| 5,544,836 A | 8/1996 | Pera | |
| 5,590,749 A | 1/1997 | Wagner et al. | |
| 5,657,841 A | 8/1997 | Morvan | |
| 5,689,171 A | 11/1997 | Ludewig | |
| 5,754,625 A | 5/1998 | Shimura | |
| 5,819,893 A | 10/1998 | Wagner et al. | |
| 6,059,081 A | 5/2000 | Patterson et al. | |
| 6,223,871 B1 | 5/2001 | Steffen | |
| 6,253,893 B1 | 7/2001 | Chi-Min | |
| D449,974 S | 11/2001 | Stekelenburg | |

* cited by examiner

NESTED CABLES AND REEL ASSEMBLY

This application claims the benefit of provisional application No. 60/180,005 filed Feb. 3, 2000.

FIELD OF THE INVENTION

This disclosure relates to nested cables and to retractable cord reels and more specifically to nested cable and retractable cord reel assemblies for use with laptop computers and other electronic devices.

BACKGROUND OF THE INVENTION

Internal rechargeable batteries power portable electronic devices such as laptop computers. Laptop computers are highly desirable due to their portability, which is directly related to their size and weight. Even though breakthroughs in computer technology have enabled manufacturers to miniaturize nearly all the computer components, advances in battery technology have been slow, resulting in little change in the size and weight of the batteries.

The batteries in a typical laptop will power the computer for only a few hours, which is inadequate for a normal businessperson. Manufacturers prefer smaller batteries because it allows them to market a smaller, more desirable product, but power capacity (battery life) is sacrificed. As a result, laptop users carry their battery charger or electrical adapter with them to meetings or wherever else they travel, and connect the laptop to high voltage power whenever possible. Because of their dependence on computers, businesspersons cannot afford for their batteries to ever run out.

Business people commonly bring their laptops everywhere they go during the workday (meetings, etc.), as well as home at night and on trips. This means they also bring the electrical adapter for the laptop everywhere they go. Laptop manufacturers have been very innovative in improving the portability of the laptops by adding such features as built-in or foldout mice. But little effort has been allotted to improving the portability of the electrical adapter that is taken along everywhere the laptop travels.

Typical electrical adapters are a rectangular box about 2.5"×4"×1.25" high. It includes two cables usually about 6 feet long. one for high voltage power (extending from a wall socket to the adapter) and the other for low voltage power (which extends from the adapter to the laptop). When a person moves from an office to a conference room, he will simply fold up the laptop, but then must unplug the adapter and manually (sometimes randomly) coil the cord around his hand or around the adapter. Sometimes the cords are not coiled at all and simply dragged behind on the floor! If a coiled cord is placed on a table or in a brief case, it will begin to uncoil as soon as it is let go. The lack of portability of a electrical adapter is very much out of sync with the excellent portability of the devices they power.

Other electric devices also have problems with storage of power cords, particularly where two cords are attached to the same device. A sewing machine, for example, often has two cords extending from the foot pedal. House current is delivered to the pedal from one cord, regulated by a control device and the action of the pedal, then delivered to the machine by a second cord. Storage of the cords and foot pedal can be cumbersome. Even when a cord reel is used for one cord, the second cord must be stuffed in a separate compartment, stored in a separate reel or clumsily wrapped around the foot pedal for storage.

SUMMARY OF THE INVENTION

These and other problems are solved by the nested cables and retractable cord reel assembly of the invention. A retractable cord reel assembly is described including a housing, a spool rotatably mounted in the housing, a first cable and a second cable, each at least partly carried by the spool, and means for releasably coupling the first cable to the second cable when the first and second cables are co-wound together onto and off of the spool. Preferably, the releasable coupling of the cables includes nesting the first and second cables together. One element for nesting of the cables includes providing one of the cables with a longitudinal cavity so that the other cable is nested into the cavity when the cables are wound together. As exemplified in the specific embodiments below, many modifications may be made for particular applications.

One particular embodiment comprises a nested cable and cord reel assembly designed for the electrical adapter for laptop computers and the cables attached to it. The assembly comprises a housing; a spool mounted for rotation in the housing; an electrical component, such as an electrical adapter, carried by the spool: a high voltage power cable having a first end connected to the electrical adapter, the high voltage power cable being windable onto and off of the spool, the high voltage cable having at least one longitudinal cavity; and a low voltage power cable having a first end connected to the electrical adapter, the low voltage cable being windable onto and off of the spool, the low voltage cable being releasably nested in the cavity of the high voltage cable when the two cables are co-wound together on said spool. The free end of the high voltage cable has a plug for connection to a standard electrical outlet. The free end of the low voltage cable has a plug or other connector adapted for connection to an electronic device, such as a laptop computer. The housing may include pocket(s) or chamber(s) for internally storing the plugs or connectors.

The invention is also useful for other electrical devices, such as a sewing machine. A nested cable and cord reel assembly is suitable to store both the cord delivering power from the house current and the cord delivering the regulated power to the sewing machine with the cords nested together. The cord reel is optionally designed to fit inside the foot pedal, which provides a convenient storage location. When it is desirable to store the sewing machine for later use, both cables are wound together into the cord reel assembly that also houses the power regulator in the pedal, providing compact and convenient storage of both cables inside the foot pedal.

In its retracted state, the high voltage and low voltage plugs are inside the cord reel housing or against the side of the housing, and are easily accessible to the user. The user pulls either the high or low voltage cable to extract the desired length of cable. Since both cables are nested together when wound on the spool, approximately equal lengths of each cable are dispensed from the cord reel regardless of which cable is pulled. All or part of the cable stowed in the cord reel may be extracted.

After use, the cord is retracted into the cord reel for neat storage and portability. Many of known methods can be used to retract the cable. A spring may be incorporated to bias the spool in the cord retracting direction, and a ratchet can be used to hold the cables in the extended position until retraction is desired. A motor or hand crank can also be used to retract the cables.

In the consumer market where cost is a major consideration, the cord can be manually retracted by turning the electrical housing while holding the cord reel housing. Since the spool is attached to the electrical housing, turning the electrical housing causes the spool to rotate and the cables to retract.

DETAILED DESCRIPTION OF THE DRAWINGS

DETAILED DESCRIPTION

Figure 1:
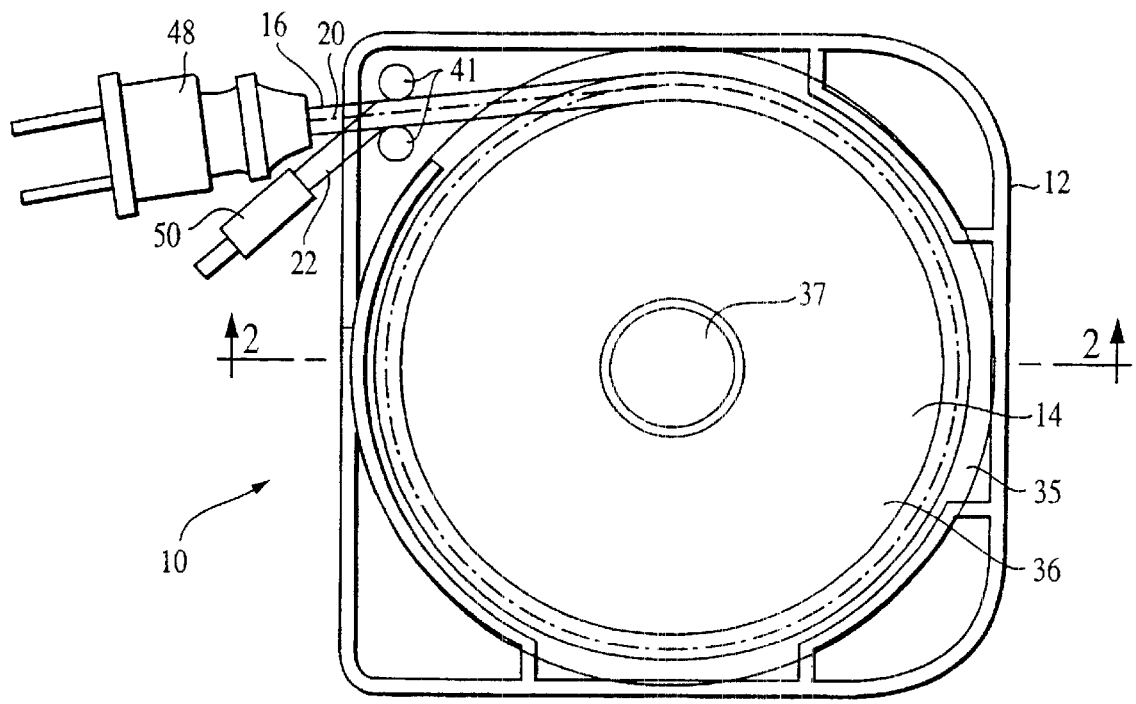
FIG. 1 is a top cross-sectional view of the present nested cables and cord reel assembly with a portion of the housing and spool cut away to show the reel assembly and guides.

A retractable cord reel assembly, generally designated 10, is described including a housing 12, a spool 14 rotatably mounted in the housing, a first cable 16 and a second cable 22, each at least partly carried by the spool, and means for releasably coupling the first cable to the second cable when the first and second cables are co-wound together onto the spool. Preferably, the releasable coupling of the cables 16, 22 includes nesting the first and second cables together. One element for nesting of the cables includes providing one of the cables with a longitudinal cavity 32 so that the other cable is nested into the cavity when the cables are wound together.

The following discussion is directed to preferred embodiments where the nested cables and cord reel assembly 10 is designed for use with the electrical adapters for laptop computers. The cables are discussed in terms of high and low voltage cables, as would be applicable to laptop computers. However, it is to be understood that the cables need not carry high/low voltage and may carry the same voltage. The invention is intended to apply to any plurality of cables or cords that may advantageously be wound around a spool for storage. The cables need not be of different types and may be, for example, two ends of a single, continuous extension cord. The electrical component is optional and depends upon the intended use for the cables. The term "electrical adapter" is used to describe any electrical component, such as an power adapter, a switch, electrical converter, battery charger or the like.

Figure 2:
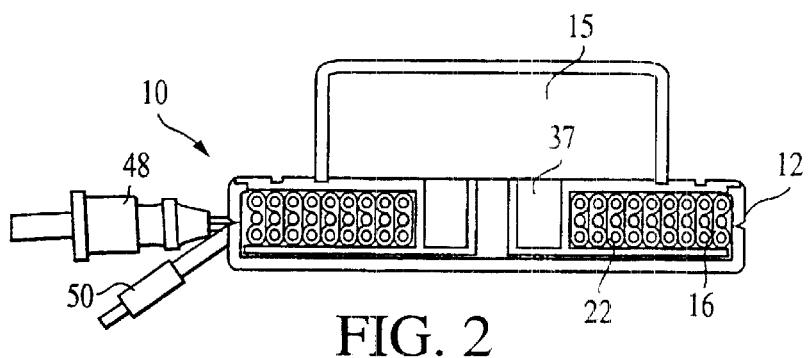
FIG. 2 is a cross section of the first embodiment taken along line 2—2 of FIG. 1.
Figure 4:
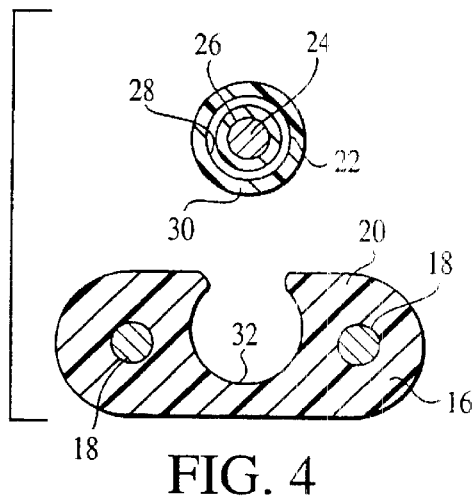
FIG. 4 is a cross sectional view of the cables of the invention, in an unnested state.
Figure 5:
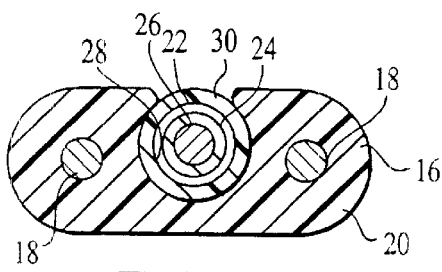
FIG. 5 is a cross sectional view of the cables of FIG. 4, shown nested together.

Turning now to FIGS. 1 and 2, which shows one embodiment of a laptop computer cord, the assembly 10, comprises a housing 12, a spool 14 rotatably mounted in the housing; an electronic converter or adapter 15, a high voltage power cable 16, and a low voltage power cable 22. The high voltage cable 16 has two conductors 18 and an insulating jacket 20 as seen in FIGS. 4 and 5. The low voltage cable 22 may comprise a co-axial cable having an inner conductor 24, insulating layer 26, outer conductor 28 and outer jacket 30. The low voltage cable 22 may be of other multi-conductor configurations as well, and is not limited to co-axial. One of the cables is provided with a means for coupling the two cables together when they are wound onto the spool 14. The preferred form of coupling is nesting one cable with the other. Other forms of coupling means may be used, such as a tongue and groove or lateral displacement of the cavity 32 to couple cables together side-by-side. Preferred nesting means is at least one longitudinal channel or cavity 32 on one of the cables adapted to receive the other cable.

FIGS. 4–14 illustrate several alternative embodiments for nesting cables 16, 22 of the invention. FIG. 4 shows the two cables separated one from the other, and FIG. 5 shows the two cables nested together. The high voltage cable 16 is similar to a typical 2-conductor lamp cord but the conductors 18 are separated creating a cavity or gap 32 between them. The low voltage cable 22 is a multi-conductor cable covered with a jacket 30 giving it a generally round cross section that fits in the gap 32 between the conductors 18 of the high voltage cable 16. Other cross sectional shapes can be used as long as the cables fit neatly together.

Figure 6:
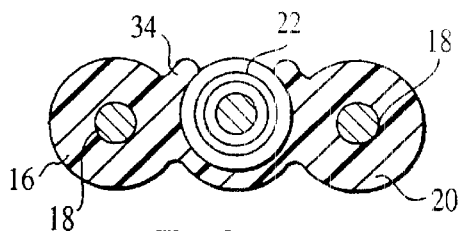
FIG. 6 is a cross sectional view of an alternate embodiment of the cables of the invention, shown nested together.
Figure 7:
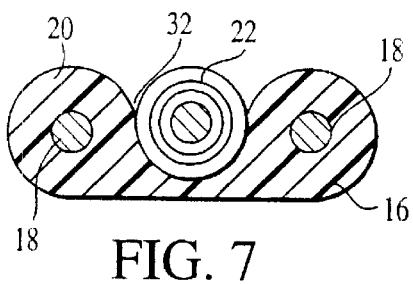
FIG. 7 is a cross sectional view of a third alternate embodiment of the cables, shown nested together.
Figure 8:
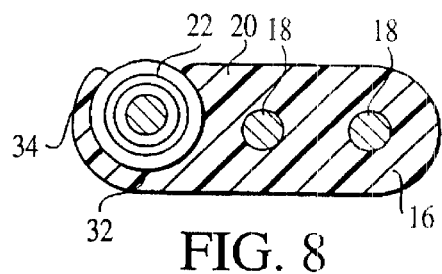
FIG. 8 is a cross sectional view of a fourth alternate embodiment of the cables of the invention, shown nested together.
Figure 9:
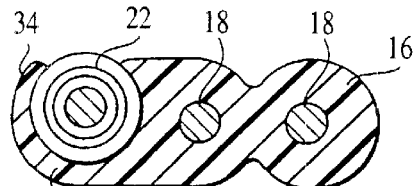
FIG. 9 is a cross sectional view of a fifth alternate embodiment of the cables of the invention, shown nested together.
Figure 10:
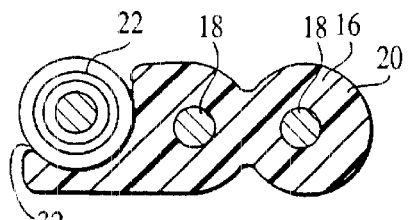
FIG. 10 is a cross sectional view of a sixth alternate embodiment of the cables of the invention, shown nested together.

Desirably, the cables 16, 22 have coincident or nearly coincident neutral axes when coupled so that both cables have the same radius of curvature while the nested cables are being wound. The neutral axis is a theoretical line that does not change in length as an object bends. As the cables are bent in an arc to be wound around the spool 14, the portion of the jackets 20, 30 on the inside of the arc will be compressed, while the portion of the jacket 20, 30 to the outside of the arc will be stretched. Because the metal conductors 18 are much stiffer than the polymer jacket 20 that surrounds them, the neutral axis will be near the center of the conductor 18. When the neutral axis of the high voltage cable 16 is not aligned with the neutral axis of the low voltage cable 22, each cable 16, 22 has a different radius of curvature, and one cable is retracted slightly faster than the other, causing the cables to slide against each other as they are wound. As best shown in FIG. 6, in some applications it is advantageous to move the conductors 18 in the high voltage cable 16 so that the neutral axes of the two cables 16, 22 will be coincident or aligned when the cables are nested. Although shown in a particular nesting configuration, this option is suitable for use with any nested cables shown in FIGS. 5–10.

Both cables 16, 22 are wound on the spool 14, with the low voltage cable 22 stowed in between the two high voltage power conductors 18. This nesting of the low voltage cable 22 into the high voltage cable 16 allows both low and high voltage cables to be wound together, minimizing the space required to stow the cable. Other cord reels that lay one flat cable on top of the other (e.g., Peterson U.S. Pat. No. 4,646,987) work well only with very thin cables. Thick cables appropriate for power transmission would result in a cord reel of very large diameter if stacked in this manner.

Nesting the low voltage cable 22 along side or in between the high voltage conductors 18 results in a smaller diameter cord reel or spool 14. The preferred configuration has the low voltage cable 22 nested in between the two high voltage conductors 18, though variations that have the low voltage cable 22 along side the pair of high voltage conductors 18 can also be acceptable in some applications. See FIGS. 8–10.

When wound on the reel 14, the longitudinal cavity 32 in the high voltage cable 16 optionally faces either inwardly, toward the center of the reel 14 (shown in FIG. 3), or outwardly, toward the side walls of the housing 12 (shown in FIG. 2). Preferably, the cavity 32 faces inwardly, so that when the cables 16, 22 are dispensed, the high voltage cable 16 is on the outside. To extend the cables 16, 22 from the assembly 10, most users pull on the outside cable. In this configuration, the high voltage cable 16 is most likely to be pulled and is better able to withstand the stress because it is generally a thicker, heavier cable than the low voltage cable 22.

Figure 11:
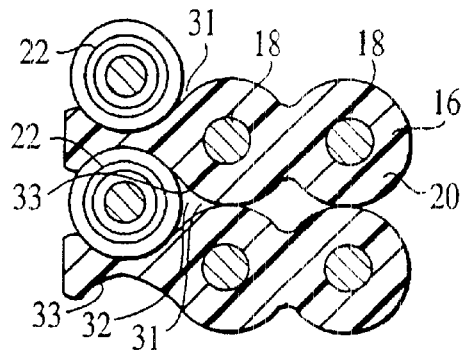
FIG. 11 is a cross sectional view of a seventh alternate embodiment of the cables of the invention, shown nested together.
Figure 12:
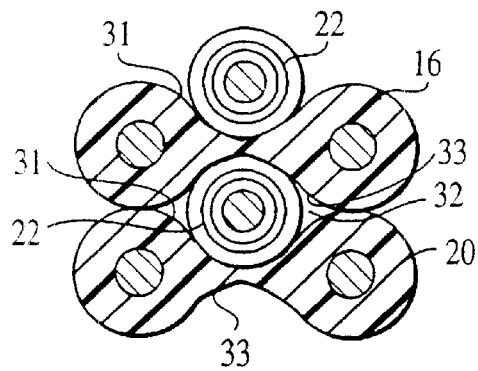
FIG. 12 is a cross sectional view of a eighth alternate embodiment of the cables, shown nested together.

In some applications, longitudinal cavity 32 may be formed between adjacent windings in cable 16, as shown in FIGS. 11 and 12. The high voltage cable 16 optionally has a first 31 and second 33 grooves that meet to form the longitudinal cavity 32. When the cables 16, 22 are wound together, the low voltage cable 22 then nests between two windings of high voltage cable 16. The low voltage cable 22 will fit partially inside the first groove 31 of the segment of high voltage cable 16 and partially inside the second groove 33 in an adjacent winding of cable 16. As winding continues and the next winding of both cables are coupled, the low voltage cable 22 is sandwiched in the grooves 31, 33 between subsequent adjacent windings of high voltage cable 16. Although the first and second grooves 31, 33 are shown symmetrically, it is contemplated that one of the cavities could be deeper than the other.

Figure 13:
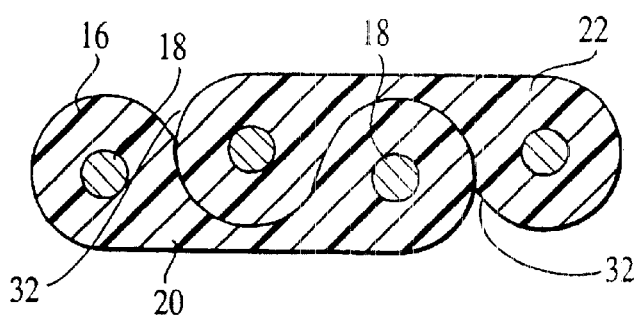
FIG. 13 is a cross sectional view of a ninth alternate embodiment of the cables of the invention, shown nested together.
Figure 14:
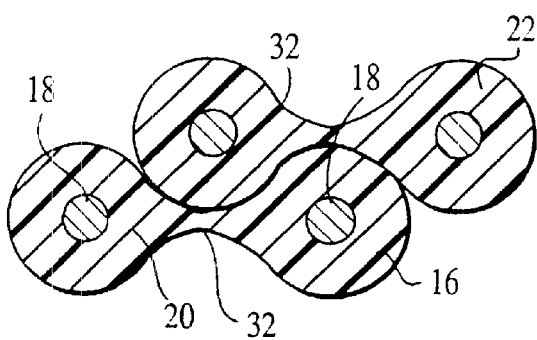
FIG. 14 is a cross sectional view of a tenth alternate embodiment of the cables of the invention, shown nested together.

FIGS. 13 and 14 show yet another pair of nested cables that is particularly suitable when both cables 16, 22 are the same size. Each of the cables 16, 22 has a longitudinal cavity 32 into which at least a portion of the other cable nests.

For some applications it may be desirable to removably lock the two cables together in a nested configuration. A locking means 35 is preferably formed by including at least one locking lip 34 on the outer edges of the cavity 32 to grip the low voltage cable 22 once it is placed within the cavity. See, FIGS. 6, 8 and 9. However, such locking means 34 is not strictly required. See, for example FIGS. 7 and 10, which do not include locking devices.

A friction device (not shown) is optionally used with any of the embodiments to prevent the cables 16, 22 from unwinding at inopportune times. When all of the cables are retracted, if there is very little friction in the rotation of the spool 14, the spool may partially unwind, for example, as a result of the elasticity of the polymer insulation being bent as it wraps around the spool during the winding process. Use of a friction device would minimize any unwinding tendency after the winding was complete, or between turns of a manually wound unit. Devices of this type are well known in the art, for example, suitable friction may be applied by a Belleville or wave spring washer on the spool axis screw.

An electrical component 15 may be mounted to one side of the spool 14 as shown. The electrical component 15 will take the form of a power converter for computer power cord applications. For sewing machine foot pedal applications, the component will take the form of a power regulatory switch. Other applications will require other electrical components as will be apparent to those skilled in the art. For some applications, e.g., simple extension cords, no intermediate electrical component is required. In such applications, the two cables 16, 22 are spliced or otherwise connected in or adjacent to the reel hub 37, or the two cables are formed from two ends of a single cord that passes through the hub without modification.

Figure 15:
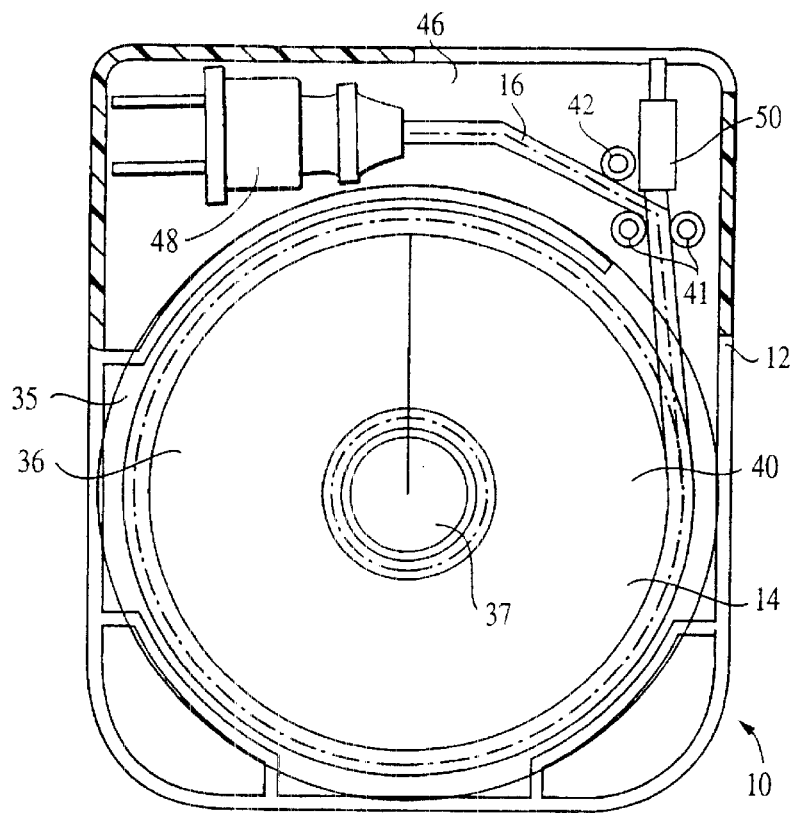
FIG. 15 is a top plan view of a second alternative embodiment of the cord reel assembly of the invention, with a portion of the housing cut away to show the reel assembly and guides.

Referring now to FIG. 15, the spool 14 has a hub 37. Both cables 16, 22 are connected to the electrical component 15, if present, at or near the hub 37 of the spool 14. Preferably, the cables 16, 22 are routed through a radial opening 38 on the cord winding surface of hub 37, then routed through axial openings 39 in the spool 14 for connection to the electrical component module 15. Optionally, axial openings (not shown) are provided in the spool 14 in the cable winding area adjacent hub 37 to connect the cabels 16, 22 into the electrical component module 15, bypassing the interior of hub 37.

The module 15 is shown as being square, however, alternate configurations may be used as desired to achieve the volume required to house the electronics and the desired aesthetics. For example the electrical component could be configured to fit partially or entirely within the hub 37 of the spool 14. Preferably, the overall size of the unit is minimized to enhance portability.

In the preferred configuration, the cord reel housing 12 will have cord guides and/or rollers 41, shown in FIG. 1, to guide the cables 16, 22 into their nested position so they neatly lie flat together as they are wound on the spool. As the individual cables 16, 22 are fed between a plurality of cord guides 41, 42, or a single cord guide and another stationary element, such as the housing 12, the two cables are pushed together into the nested position due to the limited spacing between the guides. One or more separating guides or rollers 42 are optionally added to separate the cords 16, 22 as they are retracted into the cord reel 14. If cords 16, 22 become tangled during use, the separating guide roller 42 prevents the tangled cords from getting stuck in the nesting guides 41. The separating guide 42 can also serve to separate the nested cables 16, 22 from each other as they are extended from the spool and to act as a stop to block inward movement of a line plug 48 after it is retracted into the housing 12. This keeps it in the proper place where it is conveniently reached by the user, allowing him to easily pull the plugs 48, 50 and cables 16, 22 from the housing 12 for the next use.

Figure 3:
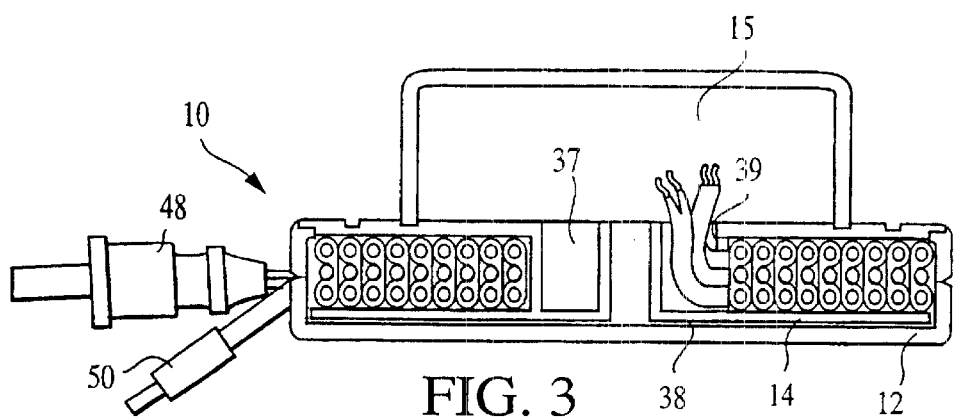
FIG. 3 is a cross section of the first embodiment of the reel assembly that is the same as FIG. 2, but illustrating an alternate cable configuration.

The first embodiment of the reel assembly 10 of the invention has the plugs 48, 50 stored on the outside of the housing 12, is shown in FIGS. 1–3. An alternate preferred embodiment is shown in FIG. 15. The reel assembly 10 comprises a housing 12, a spool 14 mounted for rotation in the housing, and an optional electronics module 15, which comprises the electrical component. In the illustrated embodiments, the housing 12 covers the circumferential edges 35 of the spool 14 and one side face 36 of the spool. The other side of the spool 14 is open to accommodate mounting of the electrical component module 15 onto the spool. Mounting of the electronics module 15 on the rotating spool 14 is preferred to minimize breakage or twisting of the portions of cables 16, 22 near the spool hub 37. The details of mounting a spool 14 for rotation within a housing 12, and retraction means, such as springs, are known in the art. See for example, Burke U.S. Pat. No. 5,094,396, the disclosures of which are hereby incorporated by reference.

FIG. 15 illustrates a housing embodiment having a pocket or chamber 46 for storing the high voltage or line plug 48 and low voltage plug 50 when not in use. Often, the line plug 48 is molded onto the high voltage cable 16 as an integral part of it. The plug 48 neatly fits into the housing 12. In this embodiment, the storage chamber 46 for the line plug 48 is located to one side of the path followed by the cables 16, 22 as they are retracted into the assembly 10. Following retraction, the line plug 48 is manually fit into the chamber for storage.

Figure 16:
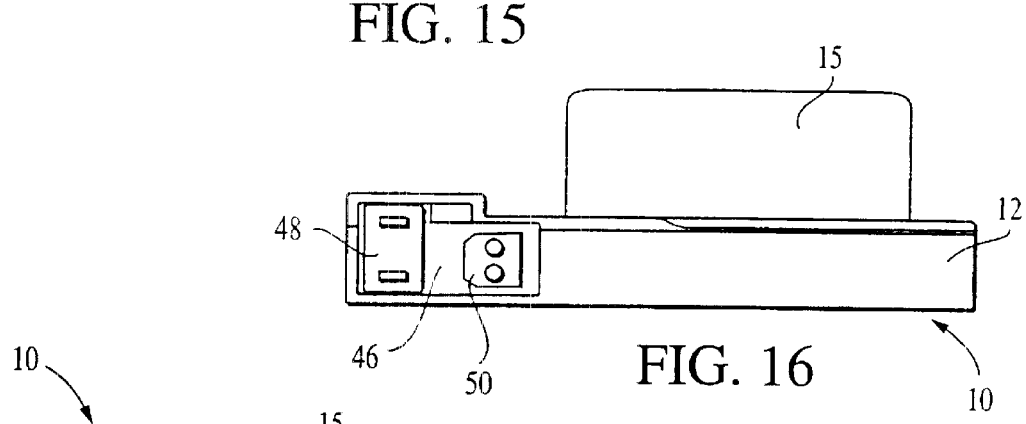
FIG. 16 is a front elevational view of the third embodiment of the cord reel of the invention.
Figure 17:
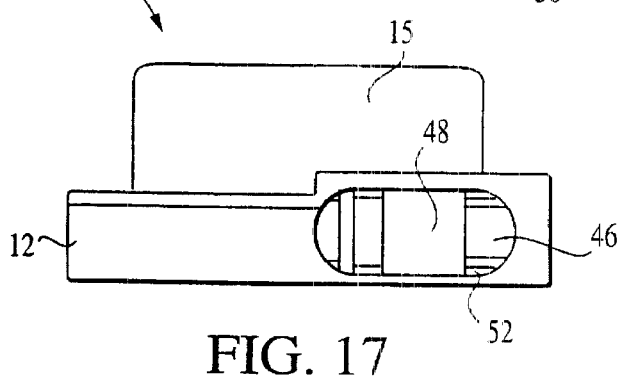
FIG. 17 is a side elevational view of the third embodiment of the reel assembly of the invention.
Figure 18:
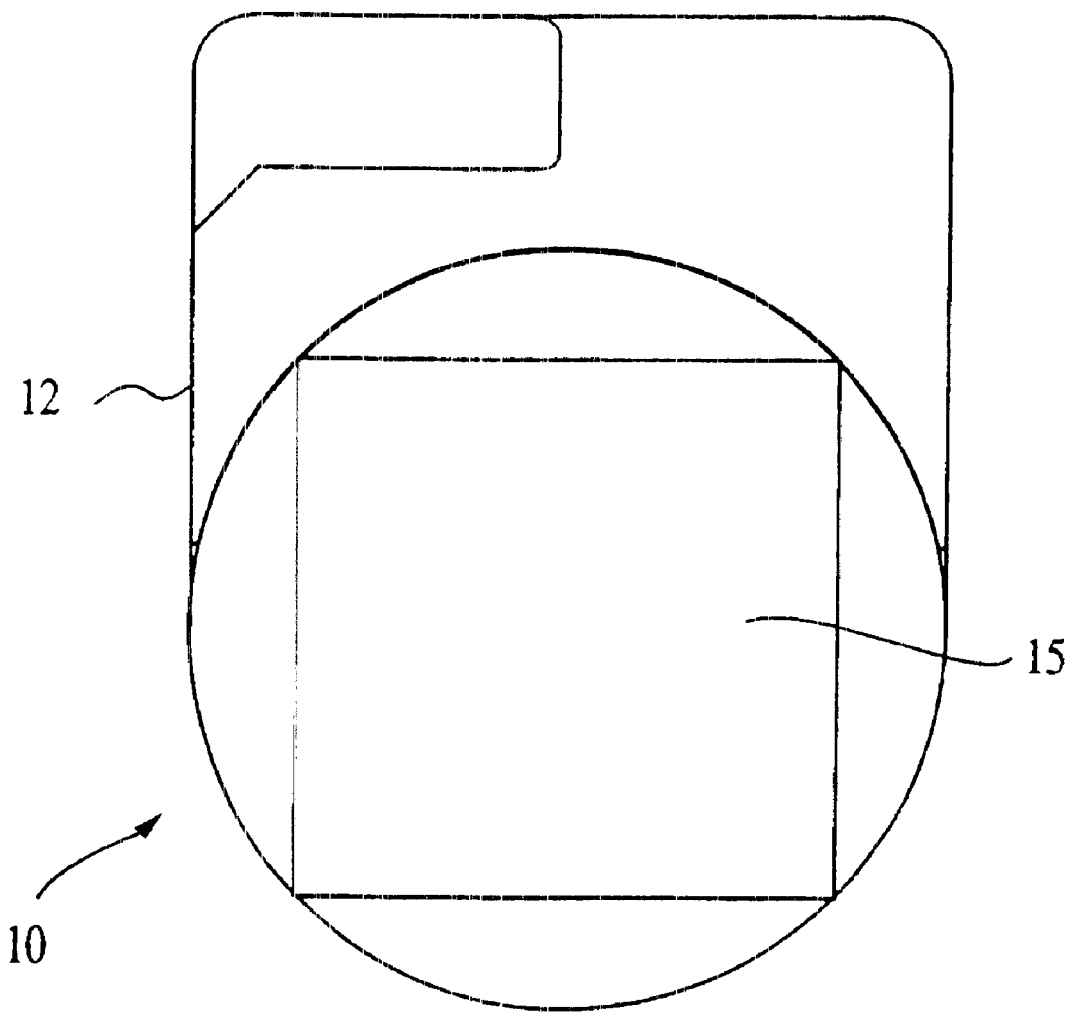
FIG. 18 is a top plan view of the third embodiment of the reel assembly of the invention.

FIGS. 16–18 show a third embodiment of the reel assembly of the invention in which the storage chamber 46 is located along the path followed by the cables 16, 22 as they are retracted into the assembly 10. As retraction of the cables 16, 22 is completed, the plugs 48, 50 are drawn into the assembly 10 and into the storage chamber 46 without separate handling by the user.

An optional opening 52 in the side of the housing 12 allows access to the plugs 48, 50 when the cables 16, 22 are fully retracted into the housing. A lever, button, slide or other mechanism (not shown) may also be employed to push or pull the plugs 48, 50 out of the housing 12. Where it is not desirable to store the plugs 48, 50 inside the housing 12, guides 41, 42 are additionally used to prevent the plugs 48, 50 from being retracted too far into the housing 12.

The apparatus of the invention is adaptable for many different applications and/or special requirements. For example, some power converters require an EMI shield bead, also known as a ferrite bead. It is often installed on the low voltage cord 22 near the connector. When this occurs, the separating rollers or guides 42 are suitably relocated or removed to allow room for the bead. The bead can optionally be relocated closer to the low voltage plug 50, incorporated as part of the plug or possibly moved into the power converter housing 15 or spool hub 37. Various modifications of the shape or size of the housing 12, or repositioning of elements to accommodate such requirements are considered to be within the scope of this invention.

The housing 12 of the invention functions to provide for rotational mounting of the spool. The housing may fully involve the spool or it may be partially or fully open. The addition of doors, covers, latches or other optional mechanisms can be added if desired. Preferably, items such as these are omitted in order to minimize complexity, cost and the number of parts that are susceptible to breakage. However, addition of such features is also considered to be within the scope of the present invention.

Accordingly, the co-wound, nested cables and reel assembly 10 of the invention is a compact device that conveniently stores the low and high voltage power cables inside the housing. It can also house optional electrical components. It provides a facile solution to longstanding problems in the art.

While particular embodiments of the nested cables and cord reel assembly have been shown and described, it will be appreciated by those skilled in the art that changes and modifications may be made thereto without departing from the invention in its broader aspects and as set forth in the following claims. More specifically, although nested cables 16, 22 have been shown and described as the preferred embodiment, one may design other means for releasably coupling the two cables together when wound onto the spool 14. Although cables 16, 22 with two conductors 18 have been shown, the invention is applicable to cables with one or more conductors. The roles of the high voltage cable and the low voltage cable may be reversed, or the cables may have the same voltage. The nested cables of the invention may have utility in applications other than retractable cord reels. Whereas the invention has particular utility as a power cord reel for laptop computers, the invention is equally applicable to other electric or electronic devices. Although an electrical component 15 has been shown and described in a preferred embodiment, other electronic means may be used in other applications, such as a signal amplifier for electronic signal cables. These and other routine modifications of the cord reel assembly of the invention will occur to those skilled in the art. All such modifications and adaptations are intended to be covered by appended claims.

What is claimed is:

1. A retractable cord reel assembly, comprising:
   a) a housing;
   b) a spool rotazably mounted in said housing;
   c) a first cable at least partly carried by said spool;
   d) a second cable, separate from said first cable, at least partly carried by said spool; and
   e) means for releasably coupling said first cable to said second cable when said first and second cables are co-wound together onto and off of said spool.

2. A retractable cord reel assembly, as in claim 1, wherein said means for releasably coupling said first cable to said second cable, comprises nesting said first and second cables together.

3. A retractable cord reel assembly as in claim 1, wherein said means for releasably coupling said first cable to said second cable comprises providing one of said first and second cables with at least one longitudinal cavity, and wherein the other of said first and second cables is nested into said cavity on retraction of said cables on said spool.

4. A retractable cord reel assembly as in claim 3 wherein said at least one longitudinal cavity comprises a gap between two conductors within said first cable.

5. A retractable cord reel assembly as in claim 3 wherein said longitudinal cavity is laterally displaced to couple said cables together side-by-side.

6. A retractable cord reel assembly as in claim 3, farther comprising means for releasably locking said other cable in said cavity.

7. A retractable cord reel assembly of claim 6, wherein said means for locking said cables comprises at least one lip adjacent said longitudinal cavity.

8. A retractable cord reel assembly as in claim 1, further comprising means for rotating said spool for retracting said cables onto said spool.

9. A retractable cord reel assembly as in claim 1, wherein said first cable comprises a high voltage cable and said second cable comprises a low voltage cable.

10. A retractable cord reel assembly as in claim 1, further comprising an electrical component mounted for rotation with said spool, and wherein said electrical component is electrically connected between said first cable and said second cable.

11. A retractable cord reel assembly as in claim 1, further comprising at least one guide member mounted on said housing for guiding said first cable and said second cable together on retraction of said cables onto said spool.

12. A retractable cord reel assembly as in claim 1, further comprising at least one separating member mounted on said housing for separating said first cable and said second cable from each other on extension of said cables from said spool.

13. A retractable cord reel assembly as in claim 1, wherein said first and said second cables have free ends, each free end having an electrical connector, and wherein said housing includes at least one chamber for said connectors.

14. A retractable cord reel assembly as in claim 3, wherein said longitudinal cavity in the first cable faces radially toward the center of the reel.

15. A retractable cord assembly as in claim 1 wherein each of said cables comprise a plurality of conductors within a jacket; said conductors being aligned such that the neutral axes have about the same radius of curvature from the center of the spool.

16. The retractable cord reel assembly of claim 1 further comprising a single opening in said housing for ingress and egress of both of said first and second cables from the same side of said housing.

17. A retractable cord reel assembly comprising:
a) a housing;
b) a spool mounted for rotation in said housing;
c) an electrical component carried by said spool;
d) a first cable having a first end connected to said electrical component, said first cable being windable onto and off of said spool, said first cable having a longitudinal cavity; and
e) a second cable having a first end connected to said electrical component, said second cable being windable onto and off of said spool, said second cable being releasably nested in said cavity of said first cable when said cables are co-wound on said spool.

18. The retractable cord reel assembly of claim 17 wherein said electrical component comprises at least one of the group consisting of a signal amplifier, a power regulator or a power converter.

19. A retractable cord reel assembly of claim 17, wherein:
said first cable comprises a high voltage cable and includes at least one longitudinal cavity comprising a gap between two conductors within said first cable;
said second cable comprises a low voltage cable that nests with said longitudinal cavity of said first cable as said cables are wound on and off said spool; and
said electrical component comprises a power adapter.

20. A retractable cord reel assembly, comprising:
a) a spool;
b) a first cable having a plurality of conductors and at least one longitudinal cavity formed in said cable, said first cable at least partly carried by said spool;
c) a second cable at least partly carried by said spool; and
d) a housing, said spool being rotatably mounted in said housing and having at least one guide member mounted on said housing for guiding said second cable to nest into said cavity in said first cable on retraction of said cables onto said spool.

21. A retractable cord reel assembly of claim 20, further comprising at least one lip on said first cable adjacent said cavity for releasably locking said second cable in said longitudinal cavity.

22. A retractable cord reel assembly, comprising:
a) a housing;
b) a spool rotatably mounted in said housing;
c) a first cable having a top surface and a bottom surface; a first longitudinal groove on said top surface and a second longitudinal groove on said bottom surface, said first and second longitudinal grooves being aligned to form a cavity between adjacent windings of said first cable; and
d) a second cable releasably nested in said cavity when said first and second cables are co-wound together onto and off of said spool.

23. The retractable cord reel assembly of claim 22 wherein said first cable is separate from said second cable.

\* \* \* \* \*

UNITED STATES PATENT AND TRADEMARK OFFICE
CERTIFICATE OF CORRECTION

PATENT NO.   : 6,702,077 B2
DATED        : March 9, 2004
INVENTOR(S)  : Richard E. Skowronski It is certified that error appears in the above-identified patent and that said Letters Patent is hereby corrected as shown below:

Column 8,
Line 50, delete "farther" and insert -- further -- therefor.

Signed and Sealed this

Twenty-sixth Day of October, 2004

JON W. DUDAS
*Director of the United States Patent and Trademark Office*